(12) United States Patent
Beisch et al.

(10) Patent No.: US 7,253,921 B2
(45) Date of Patent: Aug. 7, 2007

(54) PROCESS AND TARGET FOR CALIBRATION OF DIGITAL INPUT DEVICES

(75) Inventors: Clemens Beisch, Munich (DE); Stefan Steib, Munich (DE)

(73) Assignee: True Color Technology GmbH, Germering (DE)

( * ) Notice: Subject to any disclaimer, the term of this patent is extended or adjusted under 35 U.S.C. 154(b) by 695 days.

(21) Appl. No.: 09/973,835

(22) Filed: Oct. 11, 2001

(65) Prior Publication Data

US 2002/0044311 A1 Apr. 18, 2002

(51) Int. Cl.
*G06K 15/00* (2006.01)
*H04N 1/46* (2006.01)

(52) U.S. Cl. ...................................... 358/1.9; 358/504
(58) Field of Classification Search ................. 358/1.9, 358/504, 518, 527, 298; 382/167, 162
See application file for complete search history.

(56) References Cited

U.S. PATENT DOCUMENTS

| | | | | |
|---|---|---|---|---|
| 4,629,428 A | * | 12/1986 | Phillips | 434/98 |
| 4,977,458 A | * | 12/1990 | Granger et al. | 358/3.26 |
| 5,185,673 A | * | 2/1993 | Sobol | 358/296 |
| 5,303,334 A | * | 4/1994 | Snyder et al. | 358/1.9 |
| 5,339,176 A | * | 8/1994 | Smilansky et al. | 358/504 |
| 5,416,613 A | * | 5/1995 | Rolleston et al. | 358/518 |
| 5,455,682 A | * | 10/1995 | Ikuta | 358/3.16 |
| 5,463,720 A | * | 10/1995 | Granger | 358/1.9 |
| 6,034,788 A | * | 3/2000 | Sasanuma et al. | 358/406 |
| 6,406,833 B1 | * | 6/2002 | Nouel | 430/302 |
| 6,798,446 B2 | * | 9/2004 | Maggi | 348/207.99 |
| 2002/0030832 A1 | * | 3/2002 | Shibuya et al. | 358/1.9 |

FOREIGN PATENT DOCUMENTS

| | | |
|---|---|---|
| EP | 0674 429 A2 | 9/1995 |
| EP | 0674 429 A3 | 5/1996 |
| EP | 0423896 * | 4/2006 |
| WO | WO 98/10585 | 3/1998 |
| WO | WO 99/10835 | 3/1999 |
| WO | WO 00/44164 | 7/2000 |

OTHER PUBLICATIONS

FM screening: big gains from tiny dots ?—frequency modulated screening for printed pixtures; by Paul McDougall; Jan. 15, 1994.*
Frequency Modulated Screening; Haberbeck:, date unknown.*
A Comparison of Commercial Frequency-Modulated Screening Algorithms; Keikkita, I; 1995.*

* cited by examiner

*Primary Examiner*—Jerome Grant
(74) *Attorney, Agent, or Firm*—Foley & Lardner LLP

(57) ABSTRACT

The invention is about a process to calibrate digital input devices, especially scanners and digital cameras. An input device reads a calibration picture and an adjustment of color values is made. This is defined through the usage of a calibration picture that shows only normed, printable colors. The invention is also about a calibration target.

8 Claims, 9 Drawing Sheets

Process color yellow - color separation

Coordinates for the following tables:

Fig. 1

Fig. 2

| Nr | C | M | Y | K |
|---|---|---|---|---|
| A01 | 5 | 15 | 20 | 0 |
| A02 | 10 | 30 | 35 | 0 |
| A03 | 15 | 40 | 45 | 0 |
| A04 | 20 | 50 | 70 | 0 |
| A05 | 60 | 80 | 100 | 0 |
| A06 | 0 | 70 | 100 | 0 |
| A07 | 0 | 100 | 70 | 0 |
| A08 | 70 | 100 | 0 | 0 |
| A09 | 100 | 0 | 70 | 0 |
| A10 | 70 | 0 | 100 | 0 |
| A11 | 100 | 70 | 0 | 0 |
| A12 | 100 | 100 | 0 | 0 |
| A13 | 100 | 0 | 100 | 0 |
| A14 | 0 | 100 | 100 | 0 |
| A15 | 95 | 90 | 90 | 65 |
| A16 | 50 | 40 | 40 | 0 |
| A17 | 100 | 0 | 0 | 0 |
| A18 | 10 | 0 | 0 | 0 |
| A19 | 0 | 100 | 0 | 0 |
| A20 | 0 | 10 | 0 | 0 |
| A21 | 0 | 0 | 100 | 0 |
| A22 | 0 | 0 | 10 | 0 |
| B01 | 40 | 40 | 40 | 0 |
| B02 | 5 | 0 | 0 | 0 |
| B03 | 0 | 5 | 0 | 0 |
| B04 | 0 | 0 | 5 | 0 |
| B05 | 5 | 15 | 20 | 0 |
| B06 | 10 | 30 | 35 | 0 |
| B07 | 15 | 40 | 45 | 0 |
| B08 | 20 | 50 | 70 | 0 |
| B09 | 60 | 80 | 100 | 0 |
| B10 | 0 | 70 | 100 | 0 |
| B11 | 0 | 100 | 70 | 0 |
| B12 | 70 | 100 | 0 | 0 |
| B13 | 100 | 0 | 70 | 0 |
| B14 | 70 | 0 | 100 | 0 |
| B15 | 100 | 70 | 0 | 0 |
| B16 | 100 | 100 | 0 | 0 |
| B17 | 100 | 0 | 100 | 0 |
| B18 | 0 | 100 | 100 | 0 |
| B19 | 95 | 90 | 90 | 65 |
| B20 | 50 | 40 | 40 | 0 |
| B21 | 100 | 0 | 0 | 0 |
| B22 | 10 | 0 | 0 | 0 |
| C01 | 0 | 100 | 0 | 0 |
| C02 | 0 | 10 | 0 | 0 |
| C03 | 0 | 0 | 100 | 0 |
| C04 | 0 | 0 | 10 | 0 |
| C05 | 40 | 40 | 40 | 0 |
| C06 | 5 | 0 | 0 | 0 |
| C07 | 0 | 5 | 0 | 0 |
| C08 | 0 | 0 | 5 | 0 |
| C09 | 5 | 15 | 20 | 0 |
| C10 | 10 | 30 | 35 | 0 |
| C11 | 15 | 40 | 45 | 0 |

Fig. 2 (cont.)

| | | | | |
|---|---|---|---|---|
| C12 | 20 | 50 | 70 | 0 |
| C13 | 60 | 80 | 100 | 0 |
| C14 | 0 | 70 | 100 | 0 |
| C15 | 0 | 100 | 70 | 0 |
| C16 | 70 | 100 | 0 | 0 |
| C17 | 100 | 0 | 70 | 0 |
| C18 | 70 | 0 | 100 | 0 |
| C19 | 100 | 70 | 0 | 0 |
| C20 | 100 | 100 | 0 | 0 |
| C21 | 100 | 0 | 100 | 0 |
| C22 | 0 | 100 | 100 | 0 |
| D01 | 95 | 90 | 90 | 85 |
| D02 | 50 | 40 | 40 | 0 |
| D03 | 100 | 0 | 0 | 0 |
| D04 | 10 | 0 | 0 | 0 |
| D05 | 0 | 100 | 0 | 0 |
| D06 | 0 | 10 | 0 | 0 |
| D07 | 0 | 0 | 100 | 0 |
| D08 | 0 | 0 | 10 | 0 |
| D09 | 40 | 40 | 40 | 0 |
| D10 | 5 | 0 | 0 | 0 |
| D11 | 0 | 5 | 0 | 0 |
| D12 | 0 | 0 | 5 | 0 |
| D13 | 5 | 15 | 20 | 0 |
| D14 | 10 | 30 | 35 | 0 |
| D15 | 15 | 40 | 45 | 0 |
| D16 | 20 | 50 | 70 | 0 |
| D17 | 60 | 80 | 100 | 0 |
| D18 | 0 | 70 | 100 | 0 |
| D19 | 0 | 100 | 70 | 0 |
| D20 | 70 | 100 | 0 | 0 |
| D21 | 100 | 0 | 70 | 0 |
| D22 | 70 | 0 | 100 | 0 |
| E01 | 100 | 70 | 0 | 0 |
| E02 | 100 | 100 | 0 | 0 |
| E03 | 100 | 0 | 100 | 0 |
| E04 | 0 | 100 | 100 | 0 |
| E05 | 95 | 90 | 90 | 85 |
| E06 | 50 | 40 | 40 | 0 |
| E07 | 100 | 0 | 0 | 0 |
| E08 | 10 | 0 | 0 | 0 |
| E09 | 0 | 100 | 0 | 0 |
| E10 | 0 | 10 | 0 | 0 |
| E11 | 0 | 0 | 100 | 0 |
| E12 | 0 | 0 | 10 | 0 |
| E13 | 40 | 40 | 40 | 0 |
| E14 | 5 | 0 | 0 | 0 |
| E15 | 0 | 5 | 0 | 0 |
| E16 | 0 | 0 | 5 | 0 |
| E17 | 5 | 15 | 20 | 0 |
| E18 | 10 | 30 | 35 | 0 |
| E19 | 15 | 40 | 45 | 0 |
| E20 | 20 | 50 | 70 | 0 |
| E21 | 60 | 80 | 100 | 0 |
| E22 | 0 | 70 | 100 | 0 |
| F01 | 0 | 100 | 70 | 0 |

Fig. 2 (cont.)

| | | | | |
|---|---|---|---|---|
| F02 | 70 | 100 | 0 | 0 |
| F03 | 100 | 0 | 70 | 0 |
| F04 | 70 | 0 | 100 | 0 |
| F05 | 100 | 70 | 0 | 0 |
| F06 | 100 | 100 | 0 | 0 |
| F07 | 100 | 0 | 100 | 0 |
| F08 | 0 | 100 | 100 | 0 |
| F09 | 95 | 90 | 90 | 65 |
| F10 | 50 | 40 | 40 | 0 |
| F11 | 100 | 0 | 0 | 0 |
| F12 | 10 | 0 | 0 | 0 |
| F13 | 0 | 100 | 0 | 0 |
| F14 | 0 | 10 | 0 | 0 |
| F15 | 0 | 0 | 100 | 0 |
| F16 | 0 | 0 | 10 | 0 |
| F17 | 40 | 40 | 40 | 0 |
| F18 | 5 | 0 | 0 | 0 |
| F19 | 0 | 5 | 0 | 0 |
| F20 | 0 | 0 | 5 | 0 |
| F21 | 5 | 15 | 20 | 0 |
| F22 | 10 | 30 | 35 | 0 |
| G01 | 15 | 40 | 45 | 0 |
| G02 | 20 | 50 | 70 | 0 |
| G03 | 60 | 80 | 100 | 0 |
| G04 | 0 | 70 | 100 | 0 |
| G05 | 0 | 100 | 70 | 0 |
| G06 | 70 | 100 | 0 | 0 |
| G07 | 100 | 0 | 70 | 0 |
| G08 | 70 | 0 | 100 | 0 |
| G09 | 100 | 70 | 0 | 0 |
| G10 | 100 | 100 | 0 | 0 |
| G11 | 100 | 0 | 100 | 0 |
| G12 | 0 | 100 | 100 | 0 |
| G13 | 95 | 90 | 90 | 65 |
| G14 | 50 | 40 | 40 | 0 |
| G15 | 100 | 0 | 0 | 0 |
| G16 | 10 | 0 | 0 | 0 |
| G17 | 0 | 100 | 0 | 0 |
| G18 | 0 | 10 | 0 | 0 |
| G19 | 0 | 0 | 100 | 0 |
| G20 | 0 | 0 | 10 | 0 |
| G21 | 40 | 40 | 40 | 0 |
| G22 | 5 | 0 | 0 | 0 |
| H01 | 0 | 5 | 0 | 0 |
| H02 | 0 | 0 | 5 | 0 |
| H03 | 5 | 15 | 20 | 0 |
| H04 | 10 | 30 | 35 | 0 |
| H05 | 15 | 40 | 45 | 0 |
| H06 | 20 | 50 | 70 | 0 |
| H07 | 60 | 80 | 100 | 0 |
| H08 | 0 | 70 | 100 | 0 |
| H09 | 0 | 100 | 70 | 0 |
| H10 | 70 | 100 | 0 | 0 |
| H11 | 100 | 0 | 70 | 0 |
| H12 | 70 | 0 | 100 | 0 |
| H13 | 100 | 70 | 0 | 0 |

Fig. 2 (cont.)

| | | | | |
|---|---|---|---|---|
| H14 | 100 | 100 | 0 | 0 |
| H15 | 100 | 0 | 100 | 0 |
| H16 | 0 | 100 | 100 | 0 |
| H17 | 95 | 90 | 90 | 65 |
| H18 | 50 | 40 | 40 | 0 |
| H19 | 100 | 0 | 0 | 0 |
| H20 | 10 | 0 | 0 | 0 |
| H21 | 0 | 100 | 0 | 0 |
| H22 | 0 | 10 | 0 | 0 |
| I01 | 0 | 0 | 100 | 0 |
| I02 | 0 | 0 | 10 | 0 |
| I03 | 40 | 40 | 40 | 0 |
| I04 | 5 | 0 | 0 | 0 |
| I05 | 0 | 5 | 0 | 0 |
| I06 | 0 | 0 | 5 | 0 |
| I07 | 5 | 15 | 20 | 0 |
| I08 | 10 | 30 | 35 | 0 |
| I09 | 15 | 40 | 45 | 0 |
| I10 | 20 | 50 | 70 | 0 |
| I11 | 60 | 80 | 100 | 0 |
| I12 | 0 | 70 | 100 | 0 |
| I13 | 0 | 100 | 70 | 0 |
| I14 | 70 | 100 | 0 | 0 |
| I15 | 100 | 0 | 70 | 0 |
| I16 | 70 | 0 | 100 | 0 |
| I17 | 100 | 70 | 0 | 0 |
| I18 | 100 | 100 | 0 | 0 |
| I19 | 100 | 0 | 100 | 0 |
| I20 | 0 | 100 | 100 | 0 |
| I21 | 95 | 90 | 90 | 65 |
| I22 | 50 | 40 | 40 | 0 |
| J01 | 100 | 0 | 0 | 0 |
| J02 | 10 | 0 | 0 | 0 |
| J03 | 0 | 100 | 0 | 0 |
| J04 | 0 | 10 | 0 | 0 |
| J05 | 0 | 0 | 100 | 0 |
| J06 | 0 | 0 | 10 | 0 |
| J07 | 40 | 40 | 40 | 0 |
| J08 | 5 | 0 | 0 | 0 |
| J09 | 0 | 5 | 0 | 0 |
| J10 | 0 | 0 | 5 | 0 |
| J11 | 5 | 15 | 20 | 0 |
| J12 | 10 | 30 | 35 | 0 |
| J13 | 15 | 40 | 45 | 0 |
| J14 | 20 | 50 | 70 | 0 |
| J15 | 60 | 80 | 100 | 0 |
| J16 | 0 | 70 | 100 | 0 |
| J17 | 0 | 100 | 70 | 0 |
| J18 | 70 | 100 | 0 | 0 |
| J19 | 100 | 0 | 70 | 0 |
| J20 | 70 | 0 | 100 | 0 |
| J21 | 100 | 70 | 0 | 0 |
| J22 | 100 | 100 | 0 | 0 |
| K01 | 100 | 0 | 100 | 0 |
| K02 | 0 | 100 | 100 | 0 |
| K03 | 95 | 90 | 90 | 65 |

Fig. 2 (cont.)

| | | | | |
|---|---|---|---|---|
| K04 | 50 | 40 | 40 | 0 |
| K05 | 100 | 0 | 0 | 0 |
| K06 | 10 | 0 | 0 | 0 |
| K07 | 0 | 100 | 0 | 0 |
| K08 | 0 | 10 | 0 | 0 |
| K09 | 0 | 0 | 100 | 0 |
| K10 | 0 | 0 | 10 | 0 |
| K11 | 40 | 40 | 40 | 0 |
| K12 | 5 | 0 | 0 | 0 |
| K13 | 0 | 5 | 0 | 0 |
| K14 | 0 | 0 | 5 | 0 |
| K15 | 5 | 15 | 20 | 0 |
| K16 | 10 | 30 | 35 | 0 |
| K17 | 15 | 40 | 45 | 0 |
| K18 | 20 | 50 | 70 | 0 |
| K19 | 60 | 80 | 100 | 0 |
| K20 | 0 | 70 | 100 | 0 |
| K21 | 0 | 100 | 70 | 0 |
| K22 | 70 | 100 | 0 | 0 |

Fig. 3

| Nr | C | M | Y | K |
|---|---|---|---|---|
| GS1 | 0 | 0 | 0 | 0 |
| GS2 | 0 | 0 | 0 | 3 |
| GS3 | 0 | 0 | 0 | 3 |
| GS4 | 0 | 0 | 0 | 3 |
| GS5 | 0 | 0 | 0 | 5 |
| GS6 | 0 | 0 | 0 | 10 |
| GS7 | 0 | 0 | 0 | 15 |
| GS8 | 0 | 0 | 0 | 20 |
| GS9 | 0 | 0 | 0 | 25 |
| GS10 | 0 | 0 | 0 | 30 |
| GS11 | 0 | 0 | 0 | 35 |
| GS12 | 0 | 0 | 0 | 40 |
| GS13 | 0 | 0 | 0 | 45 |
| GS14 | 0 | 0 | 0 | 50 |
| GS15 | 0 | 0 | 0 | 55 |
| GS16 | 0 | 0 | 0 | 60 |
| GS17 | 0 | 0 | 0 | 65 |
| GS18 | 0 | 0 | 0 | 70 |
| GS19 | 0 | 0 | 0 | 80 |
| GS20 | 0 | 0 | 0 | 90 |
| GS21 | 0 | 0 | 0 | 100 |
| GS22 | 0 | 0 | 0 | 100 |
| GS23 | 0 | 0 | 0 | 100 |
| GS24 | 0 | 0 | 0 | 65 |

Process color cyan - color separation     Fig. 4
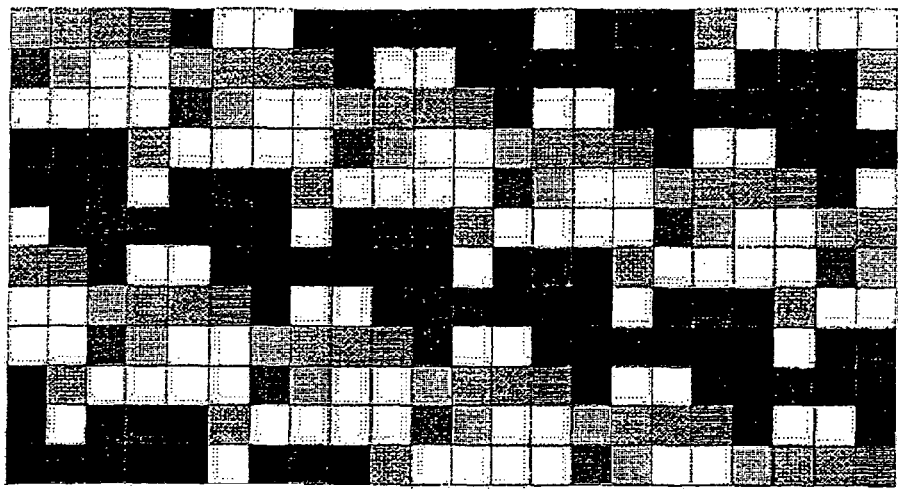
Process color magenta - color separation     Fig. 5
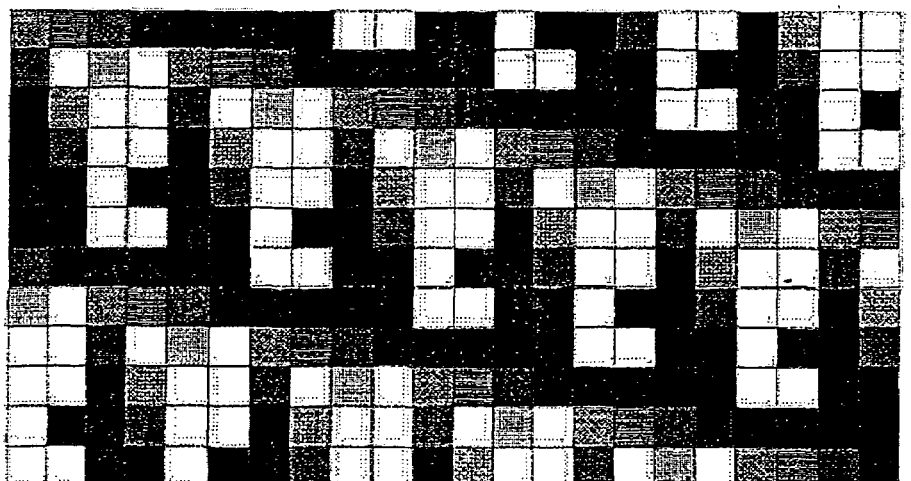

Process color yellow - color separation
Fig. 6
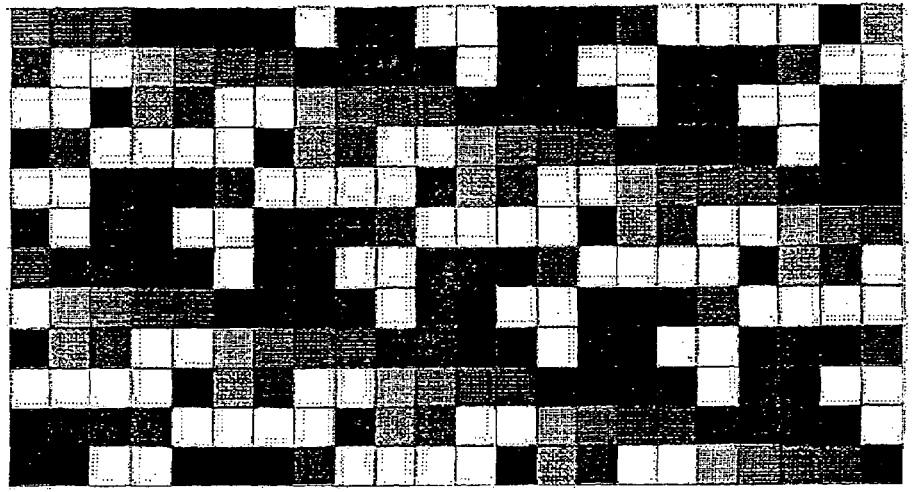
Process color black - color separation
Fig. 7
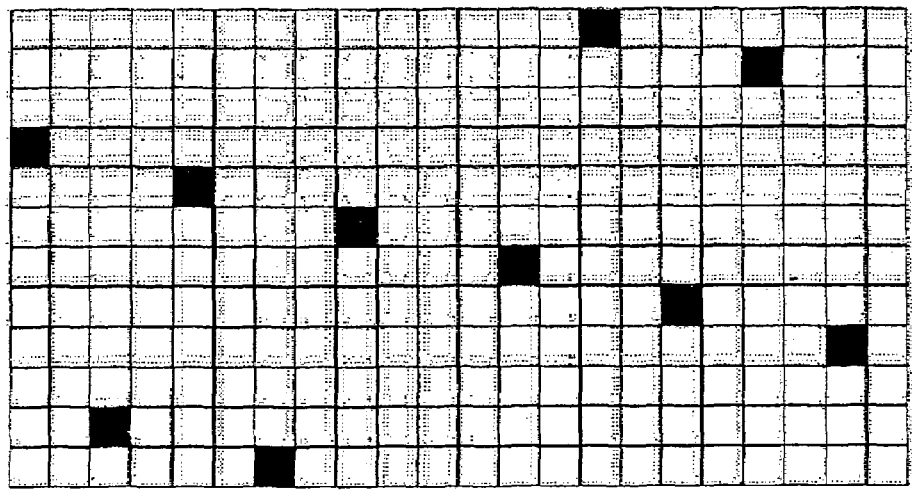

PROCESS AND TARGET FOR CALIBRATION OF DIGITAL INPUT DEVICES

DESCRIPTION

This invention is about a process and a target for calibration of digital input devices—especially for calibration of scanners and digital cameras.

While scanning or photographing a picture digitally, a set of data with information about the picture is built; an important part thereof is the color information. To achieve correctly corresponding colors of the motive within this set of data, it is necessary to calibrate such input devices, to get a similarity between the colors read by the scanner/camera into the data set, and the ones that are actually existing in the picture.

These calibrations are processed with targets, especially called calibration targets containing a picture with color wedges as well as greyscale wedges. According to the actual technology, calibration targets are used, which are photographically exposed onto photopaper—thus representing colors from an RGB Colorgamut. These are wedges of neighboring, mostly rectangular or square fields of color, with every single RGB color of the RGB gamut (which result of a color mixture of the primary colors red, green and blue) existing only once. There is a great number (IT8=288) of color fields, with only slight variations of neighboring wedges with lightness, hue and saturation.

As an example, when calibrating a scanner you first scan this calibration target and afterwards correct the resulting set of data with a software that is mostly sold together with the calibration package containing the target. (Sometimes these even need manual corrections). By this, it shall be assured, that the actual colors can be defined later on in the workflow. These calibration processes and targets according to the actual technical standard do have essential drawbacks. First of all the calibration suites available on the market are very expensive. Additionally this method of calibration inherits fundamental errors that result in sub-optimum accuracy.

The large number of RGB wedges will result in a comparably large set of data, whose information at the calibration process are transferred into other intermediately used color models (L*A*B*) with cutoffs and rounding errors, which may result into a loss of Data and distortions of otherwise harmonic curves may occur. Result is an add up of so-called systemic noise, which essentially diminishes the quality of calibration.

Further drawbacks of these calibrations are, that with every color being represented on the target only once, shift of lighting and thus resulting variation of illumination of the specific color field cannot be corrected.

The goal of this presented invention is now to offer a process and a target for calibration of digital input devices, which eliminates the disadvantages of the existing level of technology. Especially the accuracy of calibration shall be improved and calibration of input devices like scanners or digital cameras shall be offered at reasonable cost.

This task of acquiring a calibration picture with an input device and equalizing color values is solved with an inventive new process of using a calibration picture that consists of only industrially normed, printable colors according to print specifications.

Thus the invention basically differs from the actual level of technology, by that the calibration picture uses no RGB based or produced colors, but only such colors that are printable, means are applied by printing technologies. These are in a preferred implementation of the invention colors existing inside the CMYK (Cyan/Magenta/Yellow/Black) Color Gamut.

The advantage lies within the greater achievable exactness of color equalization at the calibration process, which results from a individual color space conversion into CMYK gamut. The amount of data will suffer no rounding losses or cutoffs. Conversions are reduced to a necessary minimum and color gradients will no more be harmed by distortions.

With CMYK-printable colors an exact process control during the manufacturing of the calibration targets can be guaranteed. Printing the colors of the target with frequency-modulated screenings on CPC controlled printing presses of the latest generation will ensure production of large numbers of very exactly defined targets. These targets will show normed and correct colors which are in accordance of visual and technological values of printing (for example Euroscale with Fogra BVD specifications), simulating color value equations for any given standard print screening (for example 152,4 lpi).

With a preferred implementation of the inventive process, a calibration picture is used, which contains only the most important gamut colors of the CMYK color space. This will ensure to limit the color-rendering amount and in return the resulting limited set of data is minimizing the systemic noise that occurs with the usage of RGB targets with a very large number of color fields (their big set of data will add multiple rounding errors and losses). Non-existing color values can be added arithmetically afterwards. Resulting ICC profiles will be more homogenous and harmonic, their datasets are in close accordance to industrial standards. The calibration target can be produced with offset-printing, especially sheet fed offset or rotary offset, gravure printing or screen printing.

One further advantage of the invention is the usage of a multiple, in this case tenfold repetition of the same color fields on different places on the target, whereas the measured color data of these single color fields is averaged for the resulting color data set. Identical colors are placed in a special regular pattern, which offers the possibility to adjust for deviations of object illumination at the taking of digital photographs or illumination deviations with scanners, which may distort accuracy of measured data. Averaging will reduce this effect. The special advantage is that because of the reduced number of colors on the calibration target, there is enough space available to repeat identical colors. This method is called RCC-method (Reductive/Repetitive Color Control).

The invention further covers a target for calibration of digital input devices—especially scanner and digital cameras, with a pattern of different colors which are defined solely through normed, printable colors, which are described colors from the CMYK gamut. These colors may preferably contain only the most important gamut colors of the CMYK color space and according to a most valuable implementation, shall contain a multiple, in detail tenfold repetition of identical color fields on different locations of the target, whereas there is an equally homogeneous spread over the surface of the target. There is a possibility to print the colors with frequency-modulated screening.

On the following drawings the invention will be explained further through a sample of a target (called "target") according to the specifications as explained before.

The drawings show:

Graph/FIG. 1 an empty target, placed into a system coordinates

Graph/FIG. 2 a Table I, with percentual values of Cyan, Magenta, Yellow and K (Black) in a finished target on the color fields;

Graph/FIG. 3 a Table II with percentage values of black in the grey-wedge

Graph/FIGS. 4 to 7 color separations for the process colors Cyan, Magenta, Yellow and Black (K) for an inventive target in the color fields and in the grey-wedge.

The black and white graphs/fig. shall explain the spread of color on a target according to the invention. Graph/FIG. 1 shows an empty calibration target, which holds system coordinates for the precise description of the individual fields. The target is divided into a color area (A1 to L22) and a grey-wedge area (GS1 to GS24).

The colors in the individual fields are definable with percentage values for Cyan, Magenta, Yellow and Black (K), like shown in graph/FIG. 2 (table I) for the color field and in graph/FIG. 3 (table II) for the grey-wedge. According to the percentage of components there will result a color for each individual field.

With this procedure for the first time a target according to the ANSI-norm will be set up as a 4 color CMYK target instead of a 3-color RGB target. The target inherits 264 single color fields with each 26 colors and 19 grey-values starting with white to full saturated black. The 26 main colors are elevenfold and the rest of the colors tenfold repeated. The 3% and 100% grey-values are repeated threefold.

The pattern of the measuring fields is in accordance with the ANSI (American National Standard for Graphic Arts and Photography)—Standard IT 8.7/2 for measurement of input profiles for reflective targets. The used CMYK colors are logically and per se per definition identical to the gamut of the target color space that is again CMYK. As a second deduction without loss of color information, a 3 channel color space like L*A*B* or RGB can be derived. (For example with profile conversion in an ICC—capable standard software or OPI systems or RIP software.

This means, the inventive target can be read by all standardized tools capable for creation of ICC profiles, independently of their respective manufacturer or the used CMM (Color Matching Module).

Calibration and measurement of data is optimized for an Illuminant of D50 whereas output and print control takes place at D65. Because of the CMYK printing inks a very precise process control at the manufacturing of the targets can be achieved.

Because of the ten—e.g. elevenfold repetition of the color fields on the target (placed with a defined pattern) eventual exposure and lighting variations, which could distort the measurement data, are averaged and thus much more precise (RCC=Repetitive/Reduktive Color Control). The limitation of the read color values to the most important gamutcolors of the CMYK color space, leads to an uncut readout and translation of data from RGB color space into CMYK target colorspace with one single color space conversion. By this, additional transformations into intermediate colorspaces like L*A*B* are reduced to an absolute minimum. This means, because the usage of a reduced set of data, the "systemic noise" results into an absolute minimum and the produced ICC profiles, though they are fully according to the industry standards datawise, will be mentionable more homogeneous and harmonic than with the common RGB targets. The color output simulates offset values according to print standards (in this case—Fogra IBVD Euroscale)

The graphs/FIGS. 4 to 7 show color separations for the individual Process colors (FIG. 4: Cyan; FIG. 5: Magenta; FIG. 6: Yellow; FIG. 7: Black (K)) of the inventive target. If in a single field for a process color the field is completely white, it means, that the according color is represented with 0% in this field. Completely black fields are pointing to the fact that there is a representation of 100% of the respective process color. Intermediate values mean accordingly corresponding color mixtures. (for example 50% black/grey mean 50% of the respective process color)

The invention claimed is:

1. A target for calibration of digital input devices comprising a plurality of colored fields, wherein the colored fields are printed by a subtractive multicolor printing process by means of frequency modulated screening.

2. A target according to claim 1, wherein the printing colors of the subtractive multicolor printing process are the base colors cyan, magenta, yellow, and black (CMYK).

3. A target according to claim 1, wherein the subtractive multicolor printing process is an offset printing process selected from the group consisting of a sheet fed process, a rotary offset printing process, a gravure printing process, or a screen printing process.

4. A method for calibration of a digital input device comprising:
    (a) reading a calibration picture into an input device; and
    (b) adjusting the color values based on the calibration picture, wherein the calibration picture is a target according to claim 1.

5. A method for manufacturing a calibration target for the calibration of digital input devices, comprising printing the colored fields on the calibration target by a subtractive multicolor printing process by means of frequency modulated screening in a large series production.

6. A method according to claim 5, wherein the printing colors of the subtractive multicolor printing process are the base colors cyan, magenta, yellow, and black (CMYK).

7. A method according to claim 5, wherein the subtractive multicolor printing process is an offset printing process selected from the group consisting of a sheet fed process, a rotary offset printing process, a gravure printing process, or a screen printing process.

8. A method according to claim 5, wherein the colored fields are arranged in a ten-fold repetition of equal colors at different positions of the target, wherein there is an even distribution of the same colored fields over the area of the target.

* * * * *